3,366,597
PROCESSES FOR IMPROVING POLYESTER FIBER AND FILMS WITH CALCINED KAOLINITE
Tomlinson Fort, Jr., Kinston, N.C., assignor to E. I. du Pont de Nemours and Company, Wilmington, Del., a corporation of Delaware
No Drawing. Filed May 26, 1965, Ser. No. 459,122
8 Claims. (Cl. 260—40)

This invention relates to improved fiber and film products, including textile yarns, filaments, and fibers, and to their preparation. More particularly, it relates to an improved method of preparing synthetic linear polyester compositions for extruding into film and for spinning into textile fibers possessing modified luster and friction properties.

Conventional melt-spun polyester filaments have been characterized by a smooth surface which causes yarn composed of them to have high running tensions due to dynamic friction, high static friction and high surface luster. Attempts have been made to reduce friction and luster by special sizing treatments, or other coatings applied to the filament surfaces, and by incorporating certain finely-divided inert materials in the polymer before spinning. Neither approach has been completely successful. For example, the addition of many finely-divided inert materials to molten polymer leads to the plugging of filter packs in melt-spinning operations with consequent reduction in efficiency to such an extent that commercial operation is impracticable. Furthermore, the presence of many inert materials leads to an excessive reduction in yarn strength. Reduced luster has been attained by adding pigments such as titanium dioxide, but $TiO_2$ also increases fiber opacity, which is frequently undesirable. Also, the conventional addition of $TiO_2$ has not provided the desired reduction in friction.

A particularly desirable pigment for the modification of polyester fibers and films is the mineral kaolinite because of its index of refraction and ready availability in a suitable particle size. The tendency of kaolinite to plug filter packs during melt-spinning or extrusion has been partially overcome by the recent discovery of suitable organic and inorganic deflocculating agents which are compatible with molten polyesters. However, further improvement is needed, especially with the commercially important copolymers of polyethylene terephthalate containing small amounts of sulfonate salt groups in the polymer molecule for dyeability with cationic dyes, described in Griffing and Remington U.S. Patent No. 3,018,272 dated Jan. 23, 1962. These sulfonate salt-modified polyesters, when mixed with kaolinite, have stubbornly resisted all efforts to alleviate the problem of excessive filter-pack plugging.

The present invention provides an improved procedure for preparing synthetic polyester articles having reduced surface luster. A further contribution is the provision of a method for preparing melt-spun polyester fibers exhibiting reduced running and static friction. Another advantage is that the improvements in fibers are accomplished by a procedure for incorporating an inert material in a polyester fiber without significant loss of fiber strength. A still further advantage is the provision of a procedure for incorporating a finely-divided inert material in a polyester article without encountering excessive plugging of filter packs during melt spinning or melt extrusion.

It has now been discovered that finely-divided kaolinite, without the use of deflocculating or dispersing agents of any kind, can be readily incorporated in polyester polymerization systems and the polyester melt spun or melt extruded without excessive plugging of filter packs if the kaolinite is first calcined under suitable conditions to remove all structurally bound water from the kaolinite crystals.

Therefore, the present invention provides the improvement, in the process of melt extruding and drawing synthetic linear condensation polyester fiber and film products, of incorporating calcined kaolinite in the polyester prior to extrusion to produce a product containing 0.1% to 10% by weight of the calcined kaolinite randomly dispersed therein. The calcined kaolinite has an empirical formula of $Al_2O_3 \cdot 2SiO_2$, and is prepared from kaolinite substantially free from oxides of metals other than aluminum and silicon by calcination at a temperature of about 500° to about 1700° C. to remove structurally bound water from the kaolinite crystals and still retain the characteristic hexagonal platelet structure of the crystals. The calcined kaolinite must be finely divided, consisting of particles which have equivalent spherical diameters in the range of 0.2 to 7 microns and preferably with the average particle diameter in the range 0.5 to 1.5 microns.

The calcined kaolinite can be added at any time before the polyester is extruded, but effective distribution is most easily accomplished during polymerization of the polyester. The calcined kaolinite is dispersed in glycol and added in the conventional polymerizing step for preparing film- and fiber-forming polyester. A polyester having an intrinsic viscosity of at least 0.3 is then prepared, which is melt spun into filaments and drawn into textile fibers, or is extruded into film and drawn (stretched), in conventional manner. Preferably, the calcined kaolinite is dispersed in the glycol which is used as an ester-forming component in the polymerization step.

By this procedure polyester film containing up to 10% by weight of calcined kaolinite may be readily prepared without the plugging difficulties mentioned previously. For most textile purposes, it is preferred that fibers contain from 0.1 to 3.0% by weight of calcined kaolinite.

The above process, directed to fibers, produces a drawn synthetic linear condensation polyester fiber having randomly dispersed therein hexagonal platelets of calcined kaolinite oriented roughly parallel to the fiber axis. Microscopic inspection reveals that, for the most part, each platelet is accompanied by an elongated void where the polymer has separated from the particle, and that the fiber surface exhibits slight protrusions and hollows. The filaments show a subdued surface luster, but do not have the gross reduction in transparency which is produced by equivalent amounts of $TiO_2$. Standard friction tests indicate a marked reduction in both dynamic and static friction. Fiber strength is substantially equal to that of otherwise similar fibers containing no calcined kaolinite.

The fibers produced by the process of this invention show reduced and more uniform running tensions, with greatly improved performance in mill processing, i.e., spooling, twisting, quilling, and weaving. Fabric prepared from these fibers shows a more uniform fabric structure with fewer streaks.

Conventional titanium dioxide ($TiO_2$) delustrant can also be used with the calcined kaolinite in this process to obtain a wide variety of combinations of surface luster and opacity. By proper choice of the ratio of calcined kaolinite to titanium dioxide, the polyester yarn manufacturer is able to prepare yarns with subtle luster effects hitherto difficult to obtain in a commercial process.

When directed to the preparation of film, the process of this invention produces a polyester film exhibiting low static and dynamic friction and reduced surface luster. An added advantage is the fact that the film can be written on with a common lead pencil, in contrast to unmodified polyester film which does not accept pencil markings.

Hexagonal platelets of aluminum silicate having the kaolinite crystal structure are described by C. E. Marshall in The Colloid Chemistry of the Silicate Minerals, Academic Press, Inc., New York, New York (1949), pp. 49 and 72. For the purposes of this invention it is necessary to start with a highly purified kaolinite, $$Al_2O_3 2SiO_2 \cdot 2H_2O$$

which is substantially free from oxides of metals other than aluminum and silicon. It is further necessary to use a kaolinite which is free from particles having equivalent spherical diameters larger than 7 microns, and preferably is substantially free from particles smaller than 0.2 micron. The term "equivalent spherical diameter" refers to the diameter of a sphere having the same volume as the kaolinite particle, and may be calculated from measurements made on electron micrographs of particles or from conventional sedimentation measurements.

The presence of even small quantities of particles larger than about 7 microns not only results in an appreciable drop in maximum fiber tenacity but also produces plugging of filter packs in the melt-spinning operation. On the other hand, particles smaller than about 0.2 micron do not sufficiently roughen filament surfaces to provide a significant reduction in running tensions.

In preparing the calcined kaolinite used herein, purified kaolinite of the proper particle size is heated to a temperature sufficient to remove all of the water from the crystal structure, converting the empirical formula to $Al_2O_3 \cdot 2SiO_2$. A minimum temperature of at least 500–600° C. is required for practical exposure times. For example, a suitable form of calcined kaolinite is produced by calcining in a rotary kiln at a temperature of about 800° C. Adequate calcination is accompanied by a loss in weight of about 14%, based upon the dry weight of the original kaolinite, and infrared absorption spectra show that the absorption peaks characteristic of hydroxyl groups in kaolinite (i.e., 3697, 3670, 3652 and 3620 cm.$^{-1}$) have completely disappeared. X-ray analysis reveals that the X-ray pattern of kaolinite has disappeared, but surprisingly, the hexagonal platelet structure of kaolinite, visible in electron micrographs, is retained after calcining. The $Al_2O_3 \cdot 2SiO_2$ product obtained by calcining at a temperature of about 500° C. to about 1000° C. will be referred to as "metakaolin."

If calcination of kaolinite is carried out at a temperature above 1000–1100° C., the hexagonal platelet structure of kaolinite particles is still retained, as shown by electron micrographs, but X-ray analysis indicates the gradual formation of mullite crystals. Prolonged heating at the higher temperatures converts the kaolinite into a mixture of mullite and cristobalite crystals.

Both the low-temperature and high-temperature calcined kaolinite are readily dispersible in glycol without deflocculants, and both may be incorporated in polyesters and melt spun without excessive plugging of filter packs. Both provide a rough-surfaced fiber which exhibits reduced running friction and reduced luster. On the other hand, the high-temperature calcined kaolinite has a hardness of about 6.0 on Mohs' scale, while the low-temperature calcined kaolinite has a hardness of only 2.5–3.0 on Mohs' scale, with accompanying effects on yarn abrasiveness. Thus, the yarn manufacturer now has the choice of producing a yarn with normal abrasion characteristics containing the low-temperature calcined kaolinite, or of producing a highly abrasive yarn with the high-temperature calcined kaolinite. Yarns with reduced abrasiveness are desired for most textile uses, but highly abrasive yarns are of value in certain specialized end uses.

Since calcined kaolinite is somewhat acidic, part of the erosion of certain metal guides carrying a running yarn may be caused by acidic corrosion of the metal. Such effects are overcome by incorporating a neutralizing agent, e.g., sodium acetate, in the polymer along with the pigment, or by using an alkaline finish on the yarn, e.g., one containing triethanolamine. Preferably sodium acetate is included in the glycol-pigment slurry in the amount of 0.5–2.0% by weight, based on the weight of calcined kaolinite.

The dramatic effect of calcination on pigment dispersibility is illustrated in the following Table 1 which shows glycol slurry viscosities for a series of pigment samples. High viscosities are associated with poor dispersibility. Samples of kaolinite were heated in air for 1 hour at the temperature indicated in the table and then stirred into glycol at a concentration of 20% by weight. Viscosity measurements were made on the slurry with a Brookfield viscometer at 30° C. using a speed of 6 r.p.m. The abrupt change in slurry viscosity coincides with the removal of all of the water from the kaolinite crystal.

TABLE 1

| Calcination temperature, ° C. | IR spectra | Slurry viscosity in centipoises |
| --- | --- | --- |
| 500 | —OH present | 1,775 |
| 600 | do | 1,770 |
| 700 | do | 1,175 |
| 800 | No —OH present | 35 |
| 900 | do | 35 |
| 1,000 | do | 30 |

Calcination of kaolinite is for all practical purposes an irreversible reaction, i.e., the calcined pigment may be contacted with water with no reintroduction of water molecules into the crystal lattice. Furthermore, the calcined pigment is inert to molten polyester and may be recovered from yarn in its original condition by simply dissolving the polymer away from the pigment with a suitable solvent. Thus, pigment in yarn may be easily identified by dissolving the yarn, centrifuging out the pigment, washing the pigment, and then subjecting the pigment to standard analytical procedures. One method of distinguishing between kaolinite, metakaolin (kaolinite calcined at "low temperature"), and high-temperature calcined kaolinite is by means of differential thermal analysis (DTA). DTA curves for true kaolinite show an endothermic peak at about 500° C. and an exothermic peak at about 1000° C. DTA curves for low-temperature calcined kaolinite (metakaolin) do not show the endothermic peak at 500° C., but still retain the exothermic peak at 1000° C. DTA curves for high-temperature calcined kaolinite show neither exothermic nor endothermic peaks. A more extensive discussion is given in chapter 4 of the book "The Differential Thermal Investigation of Clays," edited by Robert C. Mackenzie, Mineralogical Society, London (1957).

Calcined kaolinite is particularly suitable for use where both titanium dioxide and kaolinite particles are added to the same polymerization system. Agglomeration is particularly troublesome when $TiO_2$ is used with kaolinite, especially when added in the same slurry, unless the kaolinite has been calcined in accordance with the principles of this invention. But more important, calcined kaolinite may be incorporated in polyesters containing sulfonate salt groups of the type added for dyeability with basic dyes without encountering excessive filter pack plugging. No prior method of adding kaolinite-type materials to such polyesters has been satisfactory.

The calcined kaolinite slurry may be incorporated in the polymer by adding it to the polyester-forming reactants at the beginning of the polymerization or at some later point during the polymerization procedure. Preferably, the slurry is added after polymerization has started but before an appreciable viscosity change has occurred. In the ester interchange-polymerization procedure of Winfield and Dickson, U.S. Patent No. 2,465,319, it is preferred that the glycol slurry be added after ester interchange has been completed but before the intrinsic viscosity of the polymer has reached 0.1.

Following addition of the slurry to the polymerization mixture, the process is carried out in the conventional manner to give a fiber-forming high polymer. The polymer formed may be forwarded in the molten state through conduits to a spinning machine to be melt-spun into filaments which are subsequently drawn to give strong textile fibers. Alternatively, the polymer may be extruded as a ribbon, quenched, cut to flake and subsequently remelted for spinning into textile fibers on conventional melt-spinning equipment. The amount of calcined kaolinite used can be adjusted to impart a variety of good yarn luster and frictional properties.

In an alternative procedure, finely-divided calcined kaolinite may be blended with pre-formed solid polymer flake which is then remelted, e.g., in a screw extruder, and is then melt spun into yarn in conventional fashion. The term "flake" is conventionally used to include various forms of subdivision.

The term "synthetic linear condensation polyester," as used herein, comprehends a substantially linear polymer of fiber-forming molecular weight comprising a series of predominantly hydrocarbon groups joined by a recurring carbonyloxy radical, e.g., a polyester from glycol and dibasic acid components which is represented by the general formula,

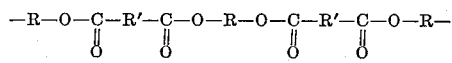

where R and R' are hydrocarbon groups of 1 to 10 carbon atoms.

As used herein, the term "polyester" is intended to include homopolyesters, copolyesters and terpolyesters prepared from bifunctional ester-forming components. Included, for example, are the polyesters disclosed in U.S. Patents Nos. 2,465,319, 2,901,466 and 3,018,272. Polyesters having an intrinsic viscosity of at least about 0.3 are considered to be of fiber-forming molecular weight. Intrinsic viscosity has been defined in U.S. Patent No. 3,057,827.

Dibasic acids useful in the preparation of polyesters and copolyesters of this invention include terephthalic acid, isophthalic acid, sebacic acid, bibenzoic acid, hexahydroterephthalic acid, ethylenedibenzoic acid, isopropylidinedibenzoic acid, 4,4'-dicarboxydiphenyl ether, 4,4''-dicarboxy-m-terphenyl, 2,6- and 2,7-naphthalene-dicarboxylic acid. Glycols useful in the preparation of the polyesters and copolyesters of this invention include the polymethylene glycols such as ethylene glycol and tetramethylene glycol and branched chain glycols such as 2,2-dimethyl-1,3-propanediol and 2,2-dimethyl-1,4-butanediol. Also included are cis- and trans-hexahydro-p-xylylene glycol, bis-p-(2-hydroxyethyl)-benzene, diethylene glycol, bis-p-(beta-hydroxyethoxy)-benzene, bis-4,4'-(beta-hydroxyethoxy) diphenyl, 1,4-dihydroxy [2·2·2]bicyclooctane, 2,2-bis(4-hydroxyphenyl)propane, 2,2-bis(4-hydroxycyclohexyl)propane, 1,4-cyclohexanediol, 4,4'-dihydroxybiphenyl, and (bicyclo-hexyl)-4,4'-dimethanol. Other polyester-forming reagents include such bifunctional components as beta-hydroxy-pivalic acid, hydroxyacetic acid, and the like.

The following examples illustrate the invention. Unless otherwise indicated, all parts and percentage figures are by weight.

EXAMPLE I

This example illustrates the preparation of a suitable "high-temperature" calcined kaolinite pigment.

A finely-divided, highly purified Georgia kaolin is calcined in a rotary kiln at 1100° C. and the hot pigment is quenched in an aqueous slurry containing tetrasodiumpyrophosphate as a dispersing agent. The pigment slurry is fractionated to give the desired pigment particle size by a series of centrifugation and gravitational settling operations. The desired slurry fraction is then flocculated with sulfuric acid and washed until all soluble salts are removed, following which the pigment is spray-dried.

Electron microscopy examination of the calcined kaolinite produced above shows that most of the pigment has the hexagonal platelet structure characteristic of kaolinite, with an average particle size of 0.8 micron, although a few "cinderlike" structures are visible. At least 99% of the particles are less than 5 microns in size. Infrared absorption spectra indicate that all the water has been removed from the kaolinite crystals. X-ray diffraction patterns show no trace of the kaolinite crystal structure, but do indicate incipient formation of the mullite crystal structure. Differential thermal analysis shows neither an endothermic peak at 500° C. nor an exothermic peak at about 1000° C. (in contrast to uncalcined kaolinite). The pigment has a hardness rating of about 6 on Mohs' scale.

EXAMPLE II

This example illustrates the preparation of a suitable "low-temperature" calcined kaolinite pigment.

The calcination procedure of Example I is repeated with the exception that the temperature of the rotary kiln is 840° C. The calcined pigment produced is shown by electron microscopy to consist of particles having the hexagonal platelet structure characteristic of kaolinite, with an average particle size of 0.55 micron. At least 97% of the particles are less than 5 microns in size. Infrared absorption spectra indicate that all of the water has been removed from the kaolinite crystals. X-ray diffraction patterns show no trace of the kaolinite crystal structure and no trace of the mullite structure. Differential thermal analysis shows no endothermic peak at 500° C., but does show an exothermic peak at 1000° C. The pigment has a hardness rating of about 2.5 on Mohs' scale.

A 20% slurry of the calcined pigment in glycol has a viscosity of 173 cp. at 30° C., measured with a Brookfield viscometer at 6 r.p.m. In contrast, a 20% slurry of uncalcined kaolinite has a viscosity of 4480 centipoises.

EXAMPLE III

This example illustrates the incorporation of calcined kaolinite in a copolyester in a continuous polymerization system.

A pigment slurry is prepared by mixing 800 parts of the calcined kaolinite prepared in Example I with 3200 parts of ethylene glycol and 400 parts of a 20% premixed slurry of titanium dioxide in glycol. The mixture is stirred vigorously in a commercial blender (Waring Blendor) for 15 minutes and is then transferred to a holding tank where it is kept under continuous agitation until used.

To a continuous-polymerization apparatus is fed a continuous stream of (a) monomeric bis-(2-hydroxyethyl) terephthalate containing 0.028% antimony trioxide as a catalyst and (b) a glycol solution of sodium bis-(2-hydroxyethyl)-5-sulfoisophthalate in sufficient quantity to give 2 mol percent in the final polymer. Simultaneously, the above-prepared glycol slurry of calcined kaolinite and TiO$_2$ is injected into the system and the slurry injection rate is adjusted to give a concentration of 2% calcined kaolinite and 0.2% TiO$_2$ in the final polymer.

The temperature of the mixture is increased and the pressure is reduced as the polymerizing liquid flows through a series of vessels with evolution and removal of glycol, the final temperature being 273° C. and the final pressure being 4 mm. of mercury in a vessel similar to that described by Pierce et al. in U.S. Patent No. 3,057,702. The finished molten polymer is extruded through a 50-hole spinneret having Y-shaped holes, quenched in cross-flow air, and then drawn about 3× at 90° C. in the apparatus disclosed by Dusenbury in U.S. Patent No. 3,045,315 to give a 70-denier (7.8 tex.) yarn of trilobal filaments having a nominal tenacity of 2.5 g.p.d. and a break elongation of 27%. Filter-pack plugging is not a problem. Examination of the filaments produced shows a random dispersion of calcined kaolinite particles, each of which is generally associated with an elongated void where the polymer has pulled away from the particle during the drawing operation. The filament surface is characterized by numerous humps and hollows which produce a subdued surface luster. The coefficient of friction is measured, with the results shown in Table 2.

For comparison, the table presents friction measurements made on yarns containing no pigment, and two concentrations of TiO₂ only. The marked reduction in friction attained by the incorporation of the calcined kaolinite is clearly shown.

TABLE 2

| Concentration of $TiO_2$, percent | Concentration of calcined kaolinite, percent | Coefficient of friction, $f_r$ |
|---|---|---|
| 0.00 | 0.00 | >0.90 |
| 0.45 | 0.00 | 0.89 |
| 2.00 | 0.00 | 0.69 |
| 0.20 | 2.00 | 0.47 |

The coefficient of hydrodynamic friction $f_r$ is measured by hanging a test filament over a ½" diameter polished chrome-plated mandrel so that the filament contacts the mandrel over an arc of approximately 180°. A 0.3-gram weight is attached to one end of the filament (input tension) and a strain gauge is attached to the other end (output tension). The mandrel is rotated at a speed of 1800 r.p.m. and the area of contact "flooded" with a drop of No. 50 mineral oil immediately before the strain gauge readings are made. The coefficient $f_r$ is calculated from the belt equation:

$$f_r = \frac{1}{\alpha} \ln \frac{T_2}{T_1}$$

where $f_r$ is the coefficient of hydrodynamic friction, $T_1$ is the input tension, $T_2$ is the output tension, and $\alpha$ is the angle of wrap in radians.

EXAMPLE IV

This example illustrates the effect of calcined kaolinite on filter-pack pressure during melt-spinning.

The general procedure of Example III is carried out with the polymer being melt spun on a spinning machine in which the filter pack contains a stack of twenty-four 325-mesh (0.043 mm. openings) screens. Throughput rate is 28 lbs. per hour (12.6 kg./hr.). The polymer pressure in the filter pack is monitored and found to increase at the rate of 10 p.s.i. per hour (0.7 kg./cm.²/hr.).

For comparison, the procedure is repeated using a non-calcined kaolinite having an average particle size of 0.55 micron. Dispersion in glycol is made with the assistance of 2% isooctylphenylpolyethoxyethanol (Triton® X-100, Rohm and Haas), one of the best organic deflocculants for kaolinite. The finished polymer is melt spun, using equipment and conditions equivalent to that described above. The rate of pressure increase in the filter pack is found to be 28 p.s.i. per hour (1.96 kg./cm.²/hr.), nearly three times that observed with the calcined kaolinite.

The coefficients of friction of the two yarns produced as described above are nearly the same. The yarn containing calcined kaolinite gives an $f_r$ value of 0.48, while the yarn containing non-calcined kaolinite gives an $f_r$ value of 0.52.

EXAMPLE V

The general procedure of Example III is repeated using the low-temperature calcined kaolinite pigment of Example II. The yarn produced is substantially equivalent to that produced in Example III, showing a subdued surface luster and low friction. The measured coefficient of friction $f_r$ is found to be 0.48, in contrast to values greater than 0.90 found for yarn containing no pigment. The measured pack-pressure rise during spinning is found to be only slightly greater than 10 p.s.i. per hour (0.7 kg./cm.²/hr.), which is considered reasonable for commercial production and is considerably lower than the rates of pack-pressure increase observed with uncalcined kaolinite, whether added to the polyester with or without a deflocculant.

EXAMPLE VI

This example illustrates the incorporation of calcined kaolinite into polypropylene terephthalate by coating polymer flake and remelting, and the effects of the pigment on the properties of filament yarn prepared from the coated flake.

To a continuous polymerization apparatus is fed a continuous stream of monomeric bis(3-hydroxypropyl) terephthalate containing 0.018% tetra isopropyl titanate as a catalyst. Simultaneously, a 6% slurry of TiO₂ in trimethylene glycol is injected into the system at a rate which gives 0.1% TiO₂ in the finished polymer.

The temperature of the mixture is increased and the pressure reduced as the polymerizing liquid flows through a series of vessels with evolution and removal of glycol, the final temperature being 267° C. at a pressure of 1.2 mm. Hg in a vessel similar to that described by Pierce et. al. in U.S. Patent No. 3,057,702. The product at this stage is polymerized to an intrinsic viscosity of 0.8.

This polymer is extruded as a ribbon, quenched cut, and screened through a ¼-inch screen once and an ⅛-inch screen twice. It is then heated at 165° C. in a vacuum oven to dry and crystallize it. The molecular weight of the product is further increased by solid phase polymerization under vacuum at 210° C. for 2½ hours. The resulting polymer flake has an intrinsic viscosity of 1.0.

The flake is tumbled for 2 hours in a Y-blender with 2% (based on weight of flake) of a suitable high-temperature calcined kaolin prepared as described in Example 1. The pigment-flake mixture is then remelted in a screw extruder and supplied to a spinning position having a conventional sand-pack spinneret arrangement. The molten polymer is extruded through a 68-hole spinneret, quenched in air, and is then drawn 4× at 210° C., using apparatus disclosed by Dusenbury in U.S. Patent No. 3,045,315, to give a 1000-denier yarn with a break elongation of 35%. Filter pack plugging is not a problem. Yarn tenacity is not reduced by the pigment. Examination of the filaments produced shows a random distribution of calcined kaolin particles. The effects of the calcined kaolin on yarn properties are described by Table 3.

TABLE 3

| Concentration of $TiO_2$, percent | Concentration of Calcined Kaolinite, percent | Yarn Tenacity, g.p.d. | Coefficient of Friction, $f_r$ |
|---|---|---|---|
| 0.1 | 0.0 | 2.6 | 0.92 |
| 0.1 | 2.0 | 2.6 | 0.49 |

EXAMPLE VII

This example illustrates the effects of increasing amounts of calcined kaolinite on the properties of copolyester filament yarns.

Polyester material is prepared and spun into filament yarns as described in Example III, except that the concentration and injection rate of the pigment-in-glycol slurry is varied to effect different concentrations of TiO₂ and calcined kaolinite in the final product. The concentrations and resulting yarn properties are presented in Table 4 below. It will be observed that increased concentrations of kaolin effect an increasing reduction in friction, without a significant deleterious effect on yarn tenacity.

TABLE 4

| Concentration of $TiO_2$, Percent | Concentration of calcined Kaolinite, Percent | Yarn Tenacity, g.p.d. | Coefficient of Friction, $f_r$ |
|---|---|---|---|
| 0.0 | 0.0 | 2.5 | >0.90 |
| 0.45 | 0.0 | 2.3 | 0.89 |
| 2.0 | 0.0 | 2.6 | 0.69 |
| 0.3 | 0.6 | 2.3 | 0.60 |
| 0.2 | 1.0 | 2.2 | 0.53 |
| 0.2 | 2.0 | 2.3 | 0.48 |

EXAMPLE VIII

This example illustrates the incorporation of calcined kaolinite into copolyester in a continuous polymerization system, and the effects of the pigment on the coefficient of friction of the resulting staple fiber product.

A pigment slurry is prepared by mixing 100 parts of the calcined kaolinite prepared as in Example I with 655 parts of ethylene glycol for 10 minutes in a high speed, high shear, mixing mill. Then 100 parts of a premixed 20% slurry of titanium dioxide in glycol is added and the entire mixture is stirred vigorously for 5 minutes. The prepared slurry is transferred to a holding tank where it is kept under continuous agitation until used.

To a continuous polymerization apparatus is fed a continuous stream of (a) monomeric bis-(2-hydroxyethyl) terephthalate containing 0.028% antimony trioxide as a catalyst and (b) a glycol solution of sodium bis-(2-hydroxyethyl)-5-sulfoisophthalate in sufficient quantity to give 2 mol percent in the final polymer. Simultaneously, the above-prepared glycol slurry of calcined kaolinite and $TiO_2$ is injected into the system and the slurry injection rate adjusted to give a concentration of 1.0% calcined kaolinite and 0.2% $TiO_2$ in the final polymer.

The temperature of the mixture is increased and the pressure reduced as the polymerizing liquid flows through a series of vessels with evolution and removal of glycol, the polymerization being completed at a final temperature of 270° C. and a final pressure of 6 mm. of mercury in a vessel similar to that described by Pierce et al. in U.S. Patent No. 3,057,702. The finished polymer is forwarded in a molten condition to a spinning machine, is extruded through a filter pack and a 378-hole spinneret, and is radially quenched as described by Dauchert in U.S. Patent No. 3,067,458. Filter-pack plugging is markedly reduced, relative to a similar process using noncalcined kaolinite. This yarn is wound onto bobbins and subsequently drawn about 3.4× at 95° C. as described by Paulsen in U.S. Patent No. 2,918,346 to give a tow bundle made up of 3 d.p.f. fibers having a tenacity of 3.0 g.p.d. and a break elongation of 28%. Examination of the filaments produced shows a random distribution of calcined kaolinite particles. The coefficient of friction is measured as described in Example III, with the results shown in Table 5 below.

TABLE 5

| Concentration of $TiO_2$, Percent | Concentration of Calc. Kaolinite, Percent | Coefficient of Fric., $f_r$ |
|---|---|---|
| 0.30 | 0.00 | 0.60 |
| 0.20 | 1.00 | 0.42 |

EXAMPLE IX

This example illustrates the incorporation of calcined kaolinite into homopolyester in a continuous polymerization system, and the effects of the pigment on the friction of the resulting staple fiber product.

A pigment slurry is prepared by mixing 150 parts of the calcined kaolinite prepared as in Example I with 600 parts of ethylene glycol for 10 minutes in a high speed, high shear, mixing mill. Then 100 parts of a pre-mixed 20% slurry of titanium dioxide in glycol is added and the entire mixture is stirred vigorously for 5 minutes. The prepared slurry is transferred to a holding tank where it is kept under continuous agitation until used.

To a continuous polymerization apparatus is fed a continuous stream of monomeric bis-(2-hydroxyethyl) terephthalate containing 0.030% antimony trioxide as a catalyst. Simultaneously, the above prepared glycol slurry of calcined kaolinite and $TiO_2$ is injected into the system and the slurry injection rate adjusted to give a concentration of 1.5% calcined kaolinite and 0.2% $TiO_2$ in the final polymer.

The temperature of the mixture is increased and the pressure reduced as the polymerizing liquid flows through a series of vessels with evolution and removal of glycol, the final temperature being 270° C. and the final pressure being 2 mm. of mercury. The finished polymer is forwarded in a molten condition to a spinning machine, extruded through a filter pack and a 378-hole spinneret and radially quenched in air. Filter-pack plugging is not a problem. This yarn is wound onto bobbins, and is subsequently drawn about 3.4× at 95° C. as described by Paulsen in U.S. Patent No. 2,918,346 to give a tow made up of 3 d.p.f. fibers having a tenacity of 3.8 g.p.d. and a break elongation of 34%. Examination of the filaments produced shows a random distribution of calcined kaolinite particles. The coefficient of friction is measured as described in Example III, with the results shown in Table 6 below:

TABLE 6

| Concentration of $TiO_2$, Percent | Concentration of Calcined Kaolinite, Percent | Coefficient of Friction, $f_r$ |
|---|---|---|
| 0.30 | 0.00 | 0.60 |
| 0.20 | 1.50 | 0.40 |

EXAMPLE X

This example illustrates the incorporation of calcined kaolinite into polypivalolactone by coating polymer flake, remelting and melt spinning the polymer into yarn.

Fifty-five and one-half liters of hexane, and 37.68 ml. of a 1-molar catalyst solution of tetrabutyl-ammonium bromide in methanol, are added to a stirred, stainless-steel vessel of 40 gallons (150 liters) capacity. To this mixture is added 27.8 pounds (12.6 kg.) of pivalolactone. Then a dispersion of $TiO_2$ in pivalolactone is added in sufficient quantity to make the $TiO_2$ concentration 0.23% in the final polymer. The mixture is heated to reflux and allowed to react for 1½ hours. The polymer separates as a solid product. This product is collected in a bag filter, then dried for 16 hours at a pressure of 12.6 cm. of mercury in an atmosphere of hot inert gas. The resulting polypivalolactone powder has an inherent viscosity of 2.11 and a typical particle size of 150–230 microns.

The polymer powder is tumbled for 2 hours in a Y-blender with 2% (based on weight of polymer) of a suitable high temperature calcined kaolin prepared as described in Example I. The pigment-polymer mixture is then pelletized, and the pellets are remelted in a screw extruder and supplied to a spinning machine having a conventional sand-pack spinneret arrangement. The molten polymer is extruded through a 34-hole spinneret, quenched in air, and then drawn 2.66× at 95° C. in the apparatus disclosed by Dusenbury in U.S. Patent No. 3,045,315 to give a 70-denier yarn with a break elongation of 20%. Filter-pack plugging is not a problem. Examination of the filaments shows a random distribution of calcined kaolinite particles. Some typical properties of the yarn are compared in Table 7 below with properties of yarn prepared in a similar fashion but containing no calcined kaolinite.

TABLE 7

| Concentration of TiO₂, Percent | Concentration of Calc. Kaolinite, Percent | Yarn Tenacity, g.p.d. | Coefficient of Fric., f_r |
|---|---|---|---|
| 0.23 | 0.00 | 2.30 | 1.02 |
| 0.23 | 2.00 | 2.20 | 0.53 |

The present invention provides a practical and efficient process for preparing useful polyester fibers containing kaolinite particles. The prior art suggests neither the process nor the exceptional fiber properties obtained by adopting the improvement features disclosed and exemplified herein. The advantages of reduced surface luster and reduced friction, as well as the wide choice of luster effects obtained in combination with TiO₂ may be obtained in a wide variety of polyester yarns including, for example, the non-round cross-sectioned fibers disclosed by Holland in U.S. Patents No. 2,939,201 and No. 2,939,202, the cotton-blending staple of Hebeler, U.S. Patent No. 3,042,520, the high-bulk fibers of Kilian, U.S. Patent No. 3,050,821, the interlaced continuous filament yarns of Bunting et al., U.S. Patent No. 2,985,995, the composite filaments of Jamieson, U.S. Patent No. 2,980,492, the spontaneously-extensible yarns of Kitson and Reese, U.S. Patent No. 2,952,879, and the bulky yarns of Breen, U.S. Patent No. 2,783,609.

Since many different embodiments of the invention may be made without departing from the spirit and scope thereof, it is to be understood that the invention is not limited by the specific illustrations except to the extent defined in the following claims.

I claim:
1. In the process of melt spinning and drawing synthetic linear condensation polyester textile fibers, wherein finely-divided inert materials are included in the polyester melt to provide fibers having subdued luster and reduced friction properties, the improvement for avoiding excessive plugging of filter packs during spinning which comprises incorporating hexagonal platelets of calcined kaolinite in the polyester prior to spinning to produce fibers containing 0.1% to 3.0% by weight of the calcined kaolinite randomly distributed therein; the calcined kaolinite having an empirical formula of Al₂O₃·2SiO₂, consisting of particles which have equivalent spherical diameters in the range of 0.2 to 7 microns, and being prepared from kaolinite substantially free from oxides of metals other than aluminum and silicon by calcination at a temperature of about 500° to 1700° C. to remove structurally bound water from the kaolinite crystals and still retain the characteristic hexagonal platelet structure of the crystals.

2. The process as defined in claim 1 wherein the calcined kaolinite is incorporated during polymerization of the linear condensation polyester by dispersing the calcined kaolinite in glycol and adding the dispersion in the polymerization process.

3. The process as defined in claim 1 wherein the calcined kaolinite is incorporated by blending with said polyester in the form of preformed solid polymer flake, which is then remelted for spinning.

4. The process as defined in claim 1 wherein the calcined kaolinite is metakaolin prepared by calcining kaolinite at a temperature of about 500° to about 1000° C., differential thermal analysis showing that the calcination has removed an endothermic peak at about 500° C. and has retained an exothermic peak at about 1000° C.

5. The process as defined in claim 1 wherein the calcined kaolinite is prepared by calcining kaolinite at a temperature above 1000° C. until differential thermal analysis shows removal of both the endothermic peak at about 500° C. and the exothermic peak at about 1000° C.

6. The process as defined in claim 1 wherein the calcined kaolinite particles have equivalent spherical diameters averaging 0.5 to 1.5 microns.

7. The process as defined in claim 1 wherein sodium acetate is incorporated with the calcined kaolinite in the amount of 0.5% to 2.0% by weight, based on the weight of calcined kaolinite.

8. The process as defined in claim 1 wherein the linear condensation polyester is a copolyester of bis-(2-hydroxyethyl)terephthalate and bis(2-hydroxyethyl)-5-sulfoisophthalate, the copolyester containing 2 mol per cent of the latter.

References Cited
UNITED STATES PATENTS

| | | | |
|---|---|---|---|
| 3,014,836 | 12/1961 | Proctor | 106—72 |
| 3,023,192 | 2/1962 | Shivers | 260—40 |
| 3,037,960 | 6/1962 | Frazer | 260—40 |
| 3,221,226 | 11/1965 | Kennedy et al. | 260—40 |

JULIUS FROME, *Primary Examiner.*

MORRIS LIEBMAN, *Examiner.*

L. T. JACOBS, *Assistant Examiner.*